United States Patent [19]
Looy

[11] Patent Number: 6,007,245
[45] Date of Patent: Dec. 28, 1999

[54] INFRARED CLOAKING EMERGENCY SURVIVAL BLANKET

[75] Inventor: Neil Looy, Woodland Hills, Calif.

[73] Assignee: Corporate Air Parts, Inc., Van Nuys, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/879,155

[22] Filed: Jun. 19, 1997

[51] Int. Cl.⁶ .................................................. B65D 30/08
[52] U.S. Cl. .............................. 383/116; 383/74; 383/75; 383/110; 383/117; 383/119
[58] Field of Search ................................ 383/110, 72, 74, 383/24, 109, 116, 108, 117, 119, 75; 229/3.5 MF; 24/115 H, 115 G; 250/519.1; 150/154; 2/69.5

[56] References Cited

U.S. PATENT DOCUMENTS

| | | |
|---|---|---|
| 515,155 | 2/1894 | Nelson .................................. 383/74 X |
| 1,834,802 | 12/1931 | Pierce ..................................... 383/108 |
| 2,832,116 | 4/1958 | Clevett, Jr. et al. .............. 24/115 H X |
| 2,931,043 | 4/1960 | Achner . |
| 3,490,507 | 1/1970 | Grashorn ............................ 383/117 X |
| 3,695,507 | 10/1972 | Sams ..................................... 383/116 |
| 3,708,810 | 1/1973 | Merikallio . |
| 3,736,769 | 6/1973 | Petersen .............................. 383/109 X |
| 4,147,829 | 4/1979 | Holland . |
| 4,264,659 | 4/1981 | Pattenden ............................ 383/119 X |
| 4,285,998 | 8/1981 | Thiboudeau ............................ 383/119 |
| 4,363,841 | 12/1982 | Snow ...................................... 383/108 |
| 4,508,776 | 4/1985 | Smith .................................... 2/69.5 X |
| 4,569,874 | 2/1986 | Kuznetz ................................ 2/69.5 X |
| 4,653,640 | 3/1987 | Akao .................................. 383/116 X |
| 4,752,990 | 6/1988 | Schutte ............................. 24/115 G X |
| 4,775,581 | 10/1988 | Siniscalchi . |
| 4,790,040 | 12/1988 | Grilliot et al. . |
| 4,833,013 | 5/1989 | Schuetz . |
| 4,886,372 | 12/1989 | Greengrass et al. ................ 383/103 X |
| 4,988,216 | 1/1991 | Lyman ..................................... 383/74 |
| 5,111,957 | 5/1992 | Hollander et al. ............. 229/3.5 MF X |
| 5,337,458 | 8/1994 | Fukutomi et al. ................ 24/115 G X |
| 5,669,119 | 9/1997 | Seron ............................... 24/115 H X |

*Primary Examiner*—Jes F. Pascua
*Attorney, Agent, or Firm*—Christie, Parker & Hale, LLP

[57] ABSTRACT

An emergency survival bag. The bag has front and rear walls joined at sides and at a bottom, but open at a mouth, to define a waterproof cavity therewithin, in which a victim may remain in the water and on land. A casing formed adjacent the mouth of the bag slidably receives a draw cord, a portion of which extends from an aperture in the casing and being accessible for use in opening and drawing closed the mouth of the bag. The walls of the bag are formed of laminated materials including insulative polymers and a metalized coating.

10 Claims, 3 Drawing Sheets

INFRARED CLOAKING EMERGENCY SURVIVAL BLANKET

FIELD OF THE INVENTION

The present invention relates to the field of survival equipment, and more particularly to emergency survival bags suitable for use in the water and on land.

BACKGROUND OF THE INVENTION

For persons who either voluntarily or involuntarily must spend time in harsh environments, such as in bodies of water or in harsh lands, which often have temperature extremes, body heat loss or gain is a serious concern. In the case of persons being in forced to remain in water, especially cold water, heat loss is an extremely grave problem. In water environments exposure to dangerous fauna, such as sharks, sea snakes, venomous jelly fish, and the like is another threat. For military personnel who find themselves in enemy territory, for example downed pilots, another fear is discovery by the body heat signatures of their target. While at time it is desirable to be "IR invisible", at times, it is also desirable to have a highly visible signaling means, such as a large section of brightly colored material, so that the victim can wave down rescue forces.

In the past there have been various attempts to address some of these concerns. U.S. Pat. No. 3,695,507 to Sams to discloses a survival bag in the form of a bag fabricated from plastic film having a metallic coating. The bag of Sams is disclosed to be made from a single sheet of folded plastic to form a sealed, waterproof bag. The top edge of the bag can be folded over to form a channel to carry a draw cord or tape to enable the opening to be closed or partially closed. Also disclosed is the possibility of sandwiching a layer of aluminum between two layers of plastic for maximum heat reflection. Sams notes its bag can be reversed to either reflect body heat in, or reflect outside heat out, and opening the top to adjust the temperate inside the bag. Sams does not disclose any IR cloaking capabilities, the ability of a user to use the bag in the water, providing the survival bag in a sealed vacuum pouch to minimize its size and storage life, utilizing a bright contrasting color on a non-reflective coated side, or placing a hook on a drawstring at the mouth of the bag so that several persons in the bags in water can be tethered together in a group, even in heavy seas.

U.S. Pat. No. 2,931,043 to Achner discloses a salving-bag used to wrap up an injured person before and while being carried. It is said to be light weight, manufactured to provide a waterproof and airtight envelope, the inside of which is lined with a coat of aluminum or similar material. It discloses a drawstring at the top. This bag also includes a zipper. As with Sams, Achner fails to disclose any IR cloaking capabilities, an in-water use of use of the bag, providing the survival bag in a sealed vacuum pouch to minimize its size and storage life, contrasting colors on the inside and outside of the bag, and/or hooks to permit multiple bags to be linked together.

U.S. Pat. No. 3,708,810 to Merikallio discloses a protective blanket made from thin and flexible material impermeable to wind and moisture, with one surface being metallically glossy and thus reflective for thermal radiation, the other surface carrying transverse straps through which poles can be inserted to convert the blanket into a stretcher for injured persons. Merikallio discloses that the aluminized surface of the blanket furnishes a light-reflective marker on the ground, and one that can serve as a radar reflector both on land and at sea. Merikallio also discloses that one side of the blanket can be aluminum pigment coated and the outer surface can be finished, for military use, in camouflaging colors.

U.S. Pat. No. 4,790,040 to Grilliot et al discloses a large zippered bag for carrying a person wearing bulky clothing and booth contaminated by hazardous waste.

There accordingly remains a need for an emergency survival bag which has IR cloaking capabilities, has good thermal retention properties, can be used while a person is in the water, is small and light enough to be easily carried and stored, yet large enough when deployed for a person or persons to enter, wearing gear, boots, packs, life vests, and the like, and has a high visibility mode and a camouflaging mode.

BRIEF SUMMARY OF THE INVENTION

In one aspect of the invention there is disclosed an emergency survival bag which conserves the body heat of a person therein.

In another aspect of the invention there is disclosed an emergency survival bag which is large enough to comfortably receive a fully clothed person and his or her gear.

In yet another aspect of the invention there is disclosed an emergency survival bag which is waterproof (or nearly waterproof), and which is sized and adapted so that a fully clothed person wearing gear and a life vest, boots, and the like, may enter and remain in the emergency survival bag in the water with a life vest without drowning and without losing excessive bodily heat.

In further aspect of the invention there is disclosed an emergency survival bag which is waterproof and adapted to prevent any bodily fluids from escaping from the bag, and which protects the person remaining therein from attracting and contacting with fauna in the immediate environment.

In yet a further aspect of the invention there is disclosed an emergency survival bag having infrared cloaking capabilities so that a soldier or equipment can evade discovery by enemy forces using infrared searching methods.

In yet another aspect of the invention there is disclosed an emergency survival bag which can be easily transposed between a high visibility mode and a low visibility, camouflage mode.

These and other aspects of the invention are set forth with particularity below.

DETAILED DESCRIPTION OF THE INVENTION

Figure 1:
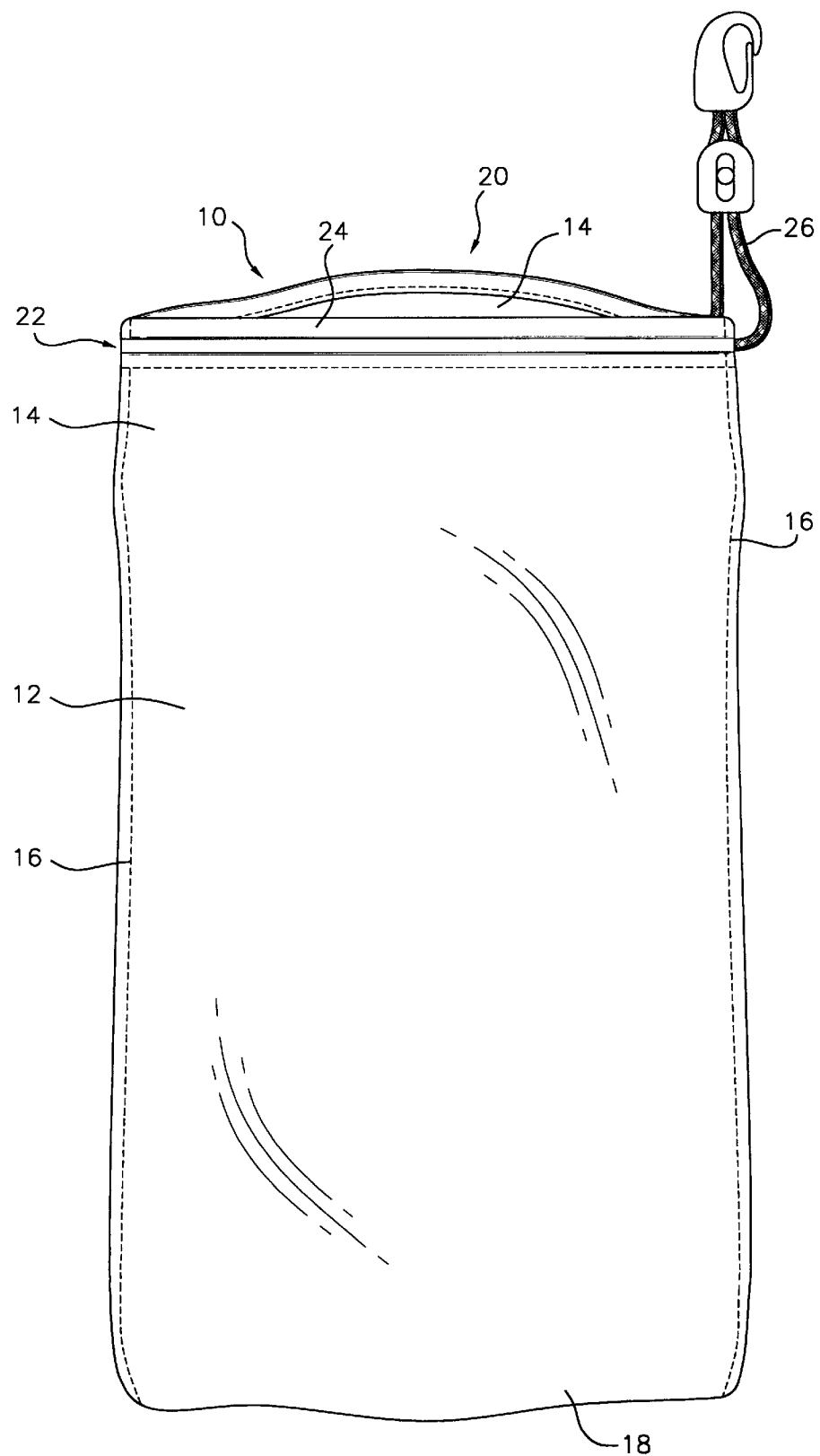
FIG. 1 is a top plan view of an embodiment of the emergency survival bag of the invention.
Figure 2:
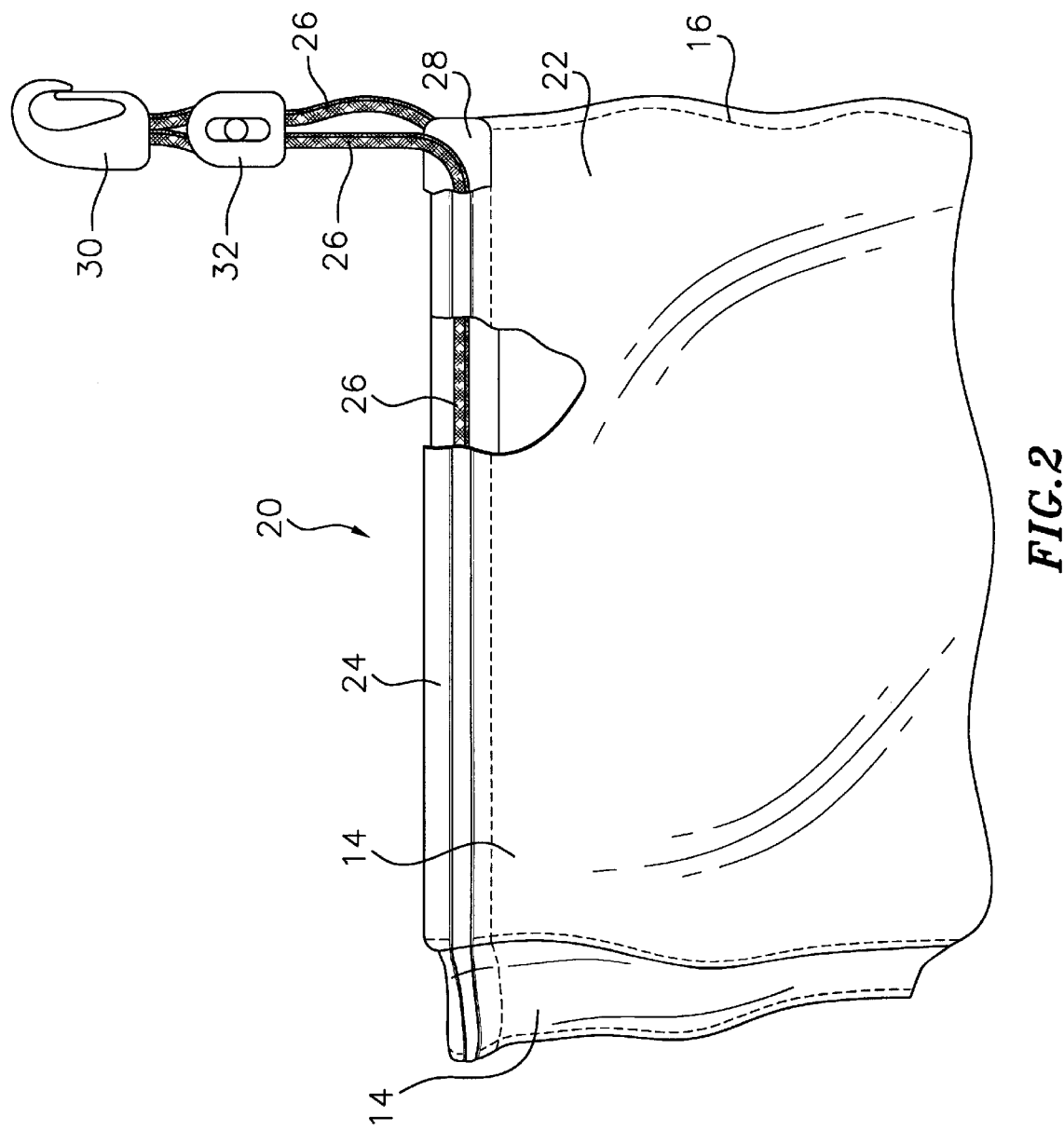
FIG. 2 is a cut-away detail view of a portion of the mouth region of the bag.

Turning to FIGS. 1 and 2, there is shown a partially exposed top plan view of an embodiment of an emergency survival bag 10 of the invention. Emergency survival bag 10 is formed from a waterproof, multi-layered laminate material 12, as will be described further below, which define a waterproof cavity therewithin. Bag 10 has a pair of walls 14 joined along their sides 16 and bottom 18, but open at an open mouth 20. The upper region 22 of bag 10 is preferably folded over to define a casing 24 in which a draw cord 26 will be slidably placed. Draw cord 26 can be made from conventional material such as cotton, nylon, polypropylene or other known natural and/or synthetic materials. Casing 24 has access apertures 28 from which portions of the draw cord 26 can be accessed and used to draw close mouth 20 of bag 10. Sides 16 can be sewn, adhered, or otherwise joined together in other conventional manners to create generally watertight seams. Alternately, one side 16 and bottom 18 can water tightly joined together to define the pillowcase-like bag 10. The inventor has found that double sewn seams provides waterproof and strong seams. Detachable attachment means 30, such as a metal or plastic hook, is preferably placed on draw cord 26. To retain the bag mouth 18 partially or completely closed, a conventional draw cord lock 32 is preferably provided on the draw cord 26. Detachable attachment means 30 can be used to tether multiple emergency survival bags 10 and persons remaining therein together in water, such as boating accident or aircraft accident victims from being separated.

The inventor has found that roughly a three foot wide (as measured between sides 16) by seven foot long (as measured between the mouth 18 and bottom 20) emergency survival bag 10 will accommodate most adults, their gear, clothing, shoes, life vests, and the life. Of course, larger or smaller sizes can be provided, as necessary. While bag 10 is primarily designed for a single person, if necessary more than one person may be accommodated therein, as the need arises.

Figure 3:
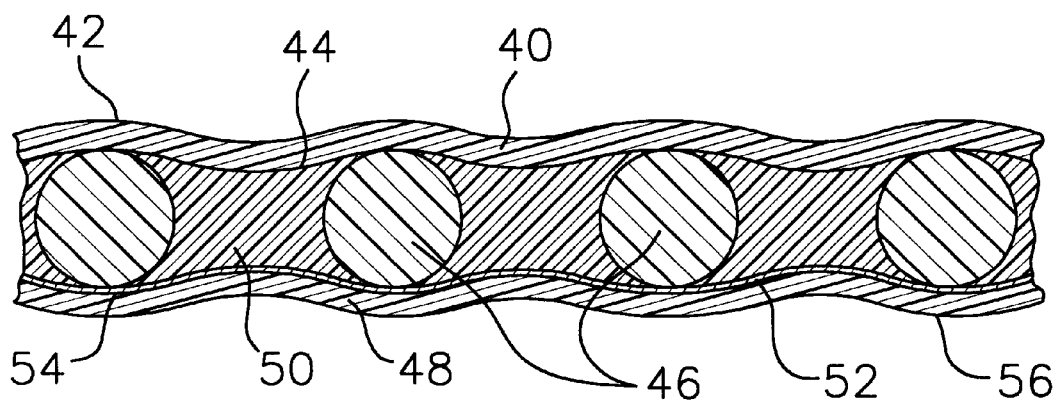
FIG. 3 is cross-sectional view of a section of material of the survival bag.

Turning to FIG. 3, a cross-sectional view of laminated material 12 used to form bag 10 is shown. In addition to polymers, materials such as kevlar, mylar, and other sheet materials having sufficient insulative properties may be utilized. A first, external layer 40 comprises a polymer, such as polyethylene film, preferably including a flame retardant, such that the material 12 can meet or exceed FAA TSO C13f burn requirement of a burn rate of less than 2.5 inches per minute, with self extinguishing properties. First layer 40 has an upper surface 42 and a lower surface 44. Upper surface 42 is exposed to the outside environment. In addition to having good flame retardant properties, first layer 40 has good thermal insulation properties. First layer 40 can also have a desired color, such as brightly colored International Safety Orange. Netting or other reinforcing material, such as 4×4 grade fiberglass scrim 46 (a loose woven fiberglass material, with spacing between the fiberglass strings), is placed below lower surface 44 of first layer 40 and is used to reinforce and prevent ripping of material 12. A backing polymer film 48, such as a polyethylene film, is laid over reinforcing material 46. A binding layer 50, such as applied by polyethylene extrudate lamination 50 (or another suitable polymer/binding agent), is applied to sandwich and bond first layer 40, reinforcing material 46 and backing film 48 together into the complete laminated film 12. Between about 10 to 14.4 pounds of melted polyethylene per ream (3000 square feet) is applied by die extrusion, resulting in a 0.7 to 1 mil thick binding layer 50. Backing film 48 has a metalized layer 52 applied on its upper surface 54, which is placed into contact with binding layer 50. Backing film 48 has a lower surface 56. About a 2 micron thick layer of vacuum deposited aluminum functions well as the metalized layer 52 to reflect heat, as will be described further below.

As noted above, first layer 40 can comprise a solid color material. If a pattern appearance is desired, first layer 40 can be clear and printed on lower surface 44 with a pattern, such as a camouflage pattern (not shown), with binding layer 50 and/or backing film 48 being opaque, such having a white color.

The above noted laminate material 12 is manufactured for inventor by Cadillac Products, Inc. of Troy Mich. In a preferred embodiment, the thickness of the various layers of the laminate material 12 are as follows:

First layer 40—approximately 1 to 3 mil, and preferably about 1.25 mil.

Reinforcing material layer 46—a greatest thickness of about 3 to 7 mil as measured by calipers at the cross-over points of scrim, and preferably about 4 to 6.5 mil.

Binding layer 50—approximately 0.7 to 1 mil, and preferably about 0.7 to 0.9 mil.

Backing layer 48—approximately 0.5 to 2 or more mil, and preferably about 0.7 mil.

Ideally, the finished material 12 will preferably have a minimum thickness of 7.5 mil and a maximum thickness of about 10 mil. A thinner material 12 has lower tear resistance, and lower insulative properties, and a thicker material is heavier, has good thermal properties, but is more difficult to manufacture and handle.

While it is known that metalized plastic sheets ("space blankets") are useful as a thermal blanket in conserving body heat, the combination of incorporating a metalized coating with a generally thick and insulative laminate material 12 functions surprisingly well to cloak the infrared heat signature of persons inside of the bag 10. The bag 10 has been tested using IR scopes. By pulling the mouth 18 of the bag 10 over the person's head, and facing downward into the ground so that heat spills into the ground, a person inside the bag 10 becomes virtually invisible to IR searching techniques. Even without facing the ground so that heat does not visibly "spill out", the signature will not appear as an human signature. This bag can therefore have important military applications for soldiers who find themselves in hostile territory needing to evade capture and assault. In such cases, the bag 10 can additionally be camouflaged to match the terrain, such as dessert conditions, forests, or snow conditions.

Another advantage afforded by the design of the bag 10 is that it is designed so that a fully clothed person wearing a floatation device, such as a life vest, can easily enter the bag while in the water and remain floating in the bag. This feature is extremely useful to boating accident victims, downed pilots, passengers and the like. Since the rate of heat exchange in water is about 25 times greater than on land, hypothermia is a grave and life threatening risk to those forced to remain in cold water for even relatively short periods of time. While some water will enter the bag along with the person, since the bag has excellent thermal retention properties (by virtue of its being made of insulative material and having the metalized coatings), the accident victim's own body heat will warm the water in the bag, at least the water close to his or her skin, and provide an extra safety factor. Because the bag is water tight, there will be little circulation of any water within the bag. Another advantage of the watertight bag is that any bodily fluids from the victim, such as any blood and urine, will remain in the bag and will therefore not attract dangerous predators, such as sharks, sea snakes, and venomous jellyfish. Also, since the bag is relatively large and made of thick material, direct contact with these same predators can be avoided and any flailing motions of a victim in the bag will be masked, and further prevent attracting predators. The detachable attachment means (hook 30) allow a group of victims in bags to tether themselves together, so that even in rough seas, victims will not drift apart.

Figure 4:
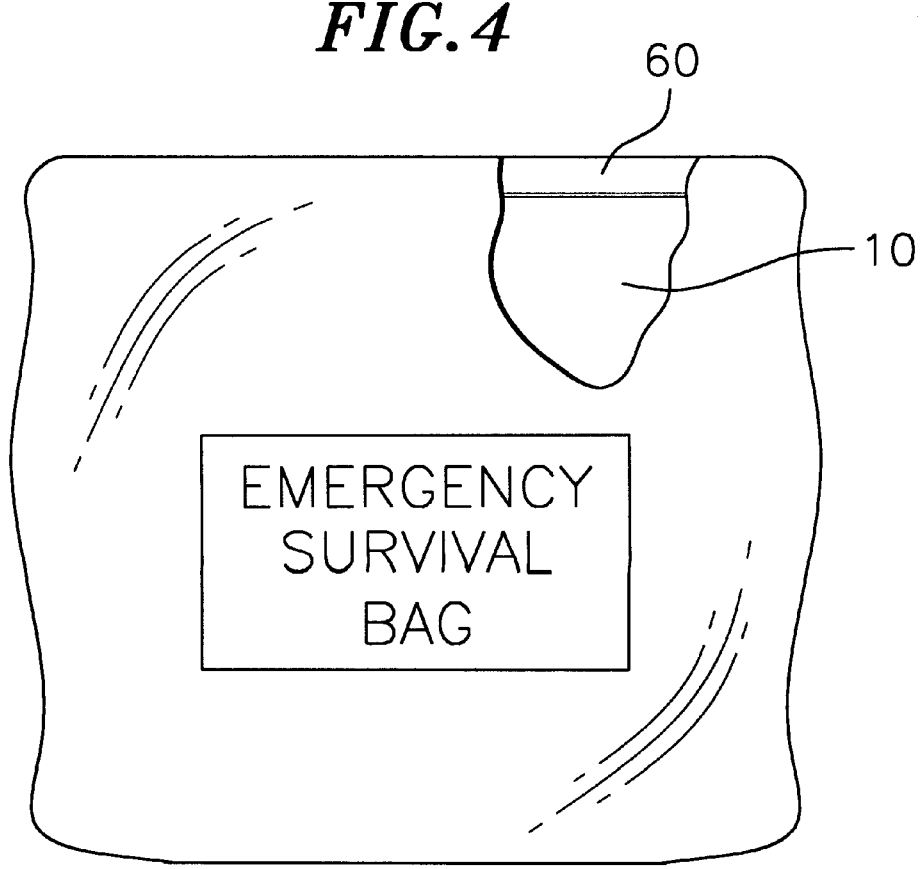
FIG. 4 is a perspective view of the survival bag of the invention in a vacuum sealed bag.

As shown in FIG. 4, the bag 10 can be folded up and sealed in a quick opening vacuum sealed bag 60 which is waterproof, vapor proof and grease proof to decrease the bag's storage size and preserve its integrity over years. In turn, a resealable zipper pouch (not shown) can be provided for storage of the bag 10 or bag in its vacuum sealed bag 60.

The drawings and the foregoing description are not intended to represent the only form of the invention in regard to the details of its methodology and manner of operation. In fact, it will be evident to one skilled in the art that modifications and variations may be made without departing from the spirit and scope of the invention. Although specific terms have been employed, they are intended in a generic and descriptive sense only and not for the purpose of limitation, the scope of the invention being delineated in the following the claims which follow.

I claim:

1. An infrared cloaking emergency survival bag, comprising:

front and rear walls joined at sides and at a bottom in a watertight manner, but open at a mouth to define a waterproof cavity therewithin in which a person may remain, even in bodies of water, the walls being formed of heat insulative and infrared cloaking material, the heat insulative and infrared cloaking material comprising laminated material having a thickness of between 7.5 and 10.0 mils and layers of polyethylene sandwiching a net material and a metallized coating, including at least one thermal insulative polymer layer.

2. The infrared cloaking emergency survival bag of claim 1, wherein the heat insulative and infrared cloaking material comprises a laminated material having a first thermal insulative polymer layer with an upper surface and lower surface having a thickness between about 1 to 3 mil, an intermediate layer of reinforcing material below the lower surface of the first thermal insulative polymer layer, a backing polymer film with an upper and lower surface and having a thickness between about 0.5 to 2 mil and placed below the intermediate layer of reinforcing material, a metalized layer applied to the upper surface of the backing polymer film, a bonding layer sandwiched between the first thermal insulative polymer layer and the backing polymer film and holding the first thermal insulative polymer layer, the backing polymer film, and the intermediate layer of reinforcing material together, and the bonding layer being about 0.7 to 1 mil thick.

3. The infrared cloaking emergency survival bag of claim 2, wherein the reinforcing layer comprises netting.

4. The emergency survival bag of claim 1, further comprising a casing formed adjacent the mouth of the bag, an aperture formed in the casing, and a draw cord means slidably located in the casing with a portion extending from the aperture in the casing and accessible for use in opening and drawing closed the mouth of the bag.

5. The infrared shielding emergency survival bag of claim 4, further comprising a detachable attachment means on the draw cord.

6. The infrared shielding emergency survival bag of claim 4, further comprising a draw cord lock.

7. An infrared cloaking emergency survival bag, comprising:

front and rear walls joined at sides and at a bottom in a watertight manner, but open at a mouth to define a waterproof cavity therewithin in which a person may remain, even in bodies of water, a casing formed adjacent the mouth of the bag, an aperture formed in the casing, and a draw cord means slideably located in the casing with a portion extending from the aperture in the casing and accessible for use in opening and drawing close the mouth of the bag, the walls being formed of heat insulative and infrared cloaking material comprising a laminated material having a first thermal insulative polymer layer with an upper surface and lower surface having a thickness between about 1 to 3 mil, an intermediate layer of reinforcing material below the lower surface of the first thermal insulative polymer layer, a backing polymer film with an upper and lower surface and having a thickness between about 0.5 to 2 mil and placed below the intermediate layer of reinforcing material, a metalized layer applied to the upper surface of the backing polymer film, a bonding layer sandwiched between the first thermal insulative polymer layer and the backing polymer film and holding the first thermal insulative polymer layer, the backing polymer film, and the intermediate layer of reinforcing material together, and the bonding layer being about 0.7 to 1 mil thick.

8. The infrared cloaking emergency survival bag of claim 7, wherein the heat insulative and infrared cloaking material preferably being between 7.5 and 10.0 mil thick.

9. The infrared cloaking emergency survival bag of claim 7, further comprising a detachable attachment means on the draw cord, and a cord lock.

10. The infrared cloaking emergency survival bag of claim 7, wherein the reinforcing layer comprises netting.

* * * * *